Patented June 21, 1927.

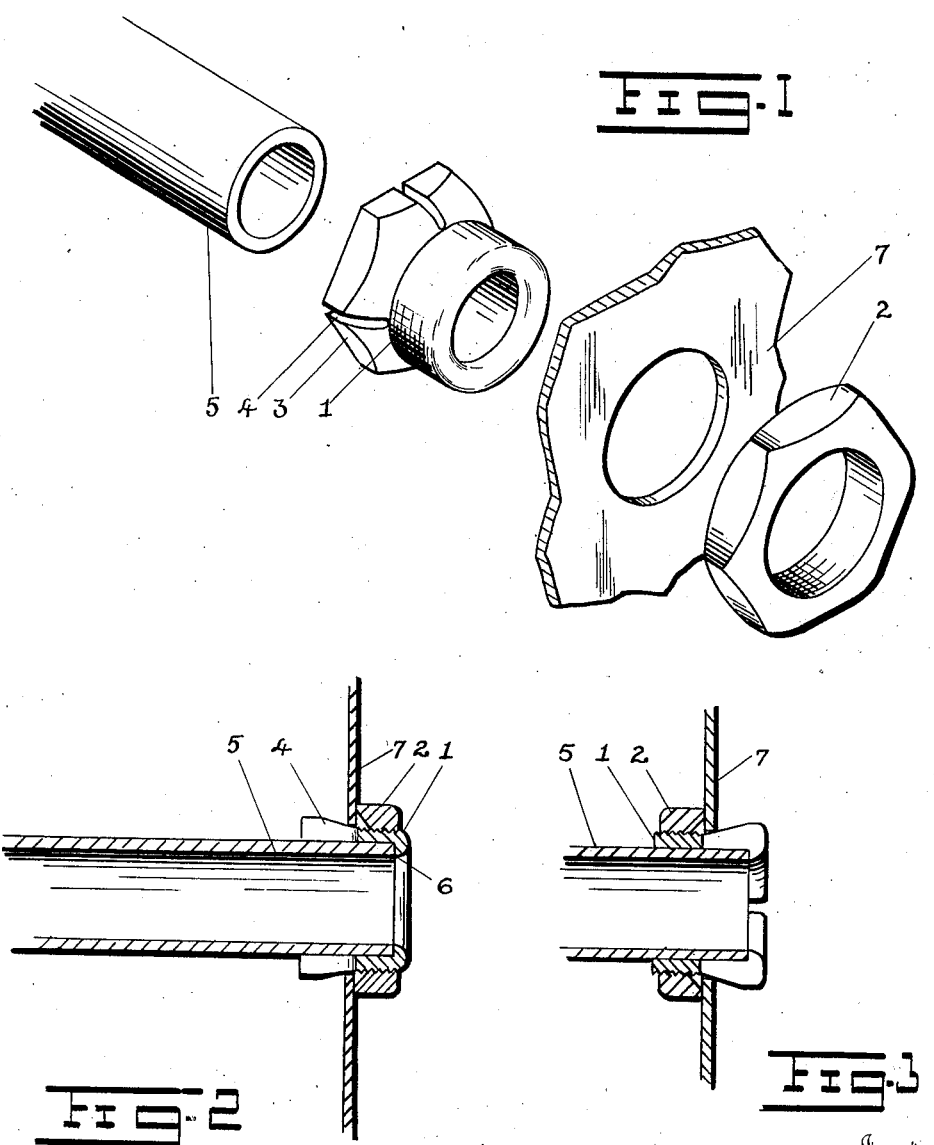

1,632,843

UNITED STATES PATENT OFFICE.

THOMAS H. LUDLOW, OF ROCHESTER, NEW YORK.

CONDUIT BUSHING ADAPTER.

Application filed May 22, 1925. Serial No. 32,231.

The object of this invention is to provide a new and improved form of adapter for fastening the ends of conduits into the conduit box or outlet box without having to thread the end of the conduit.

This and other objects of this invention will be fully illustrated in the drawing, described in the specification and pointed out in the claims at the end thereof.

In the accompanying drawing:

Figure 1 is a detail perspective view of the end of a conduit, the adapter, a portion of the conduit or outlet box and the lock nut for the adapter, the parts being shown in their relative position in which they are brought together.

Figure 2 is a longitudinal sectional view of these parts after they are fastened and locked together.

Figure 3 is a longitudinal sectional view of a slightly modified form of the adapter.

In the figures of the drawing like reference numerals indicate like parts.

The present or most common practice of fastening the ends of conduit into the conduit or outlet box is to thread the end of the conduit and pass the threaded end thru the hole in the box with a lock nut threaded to the conduit at both the outside and inside of the box so that when the two lock nuts are threaded toward each other and against the wall of the box they firmly hold the conduit in place in the hole in the conduit or outlet box. This method is slow as each conduit after being cut to the proper length has to be threaded before it can be fastened into the conduit box. In fastening the end of the conduit into the outlet box with the adapter forming the subject matter of my invention, the conduit does not have to be threaded but is simply cut to the desired length and the end placed into the adapter and clamped in place in the hole in the outlet box by means of the adapter.

As illustrated in the drawing the adapter comprises the sleeve 1. One end of this sleeve is threaded on the outside to receive the lock nut 2 while the other end is enlarged and terminates into the hexagonal head 3. The portion of the sleeve between the hexagonal head 3 and the threaded portion of the sleeve is conical and both the hexagonal head and this conical portion of the sleeve are slotted by means of a series of slots 4, 4.

The inside of the sleeve is smooth and just large enough in diameter to receive the end of the conduit 5. At the threaded end of the sleeve on the inside thereof is provided the shoulder 6 against which the end of the conduit rests when the sleeve is slipped over it, as illustrated in section in Figure 2. After the sleeve 1 is placed on the end of the conduit it is inserted with its threaded end into the hole of the conduit or outlet box. The lock nut 2 is then threaded to the sleeve and drawn tight against the inside of the wall 7 of the box, forcing the edge of the hole thru which the adapter projects, up on the inclined conical portion of the sleeve 1. The end of the lock nut resting against the conduit box is undercut at 2$^A$ to form an overhanging shoulder 10 thereon. This overhanging shoulder 10 rests against the wall of the conduit box surrounding the opening therein and forces the wall up onto the inclined conical shoulder. This overhanging shoulder makes it possible to not only force the wall as far as the end of the thread on the sleeve or the beginning of the conical shoulder but slightly beyond it to insure a rigid clamping effect between the adapter and the conduit box as well as the adapter and the conduit placed therein.

The fact that the conical portion of the sleeve and the hexagonal head thereof is divided by a series of slots provides a spring action between the sections of this portion of the sleeve so that when the edge of the hole in the wall of the outlet box is forced up in the conical portion of the sleeve, the longitudinally divided sections of the conical portion and hexagon head of the sleeve are forced together and firmly grip the end of the conduit placed between them.

The tighter the lock nut is drawn against the inside of the wall of the conduit or outlet box the more the divided sections of the sleeve are compressed and grip the end of the conduit placed into the sleeve. In this way the end of the conduit can be firmly fastened into any conduit or outlet box without threading the ends thereof, and clamping the conduit in place in the conduit or outlet box by means of two lock nuts one threaded to the conduit or the outside of the box and the other threaded to the conduit on the inside of the box.

The hexagon head 3 is provided on the sleeve of the adapter to make it possible to hold the sleeve against rotation while the lock nut is being tightened on the inside of the box. This is essential as otherwise the sleeve would turn in the hole in the box and prevent the drawing tight of the lock nut.

The threaded end of the sleeve as well as the outer end of the shoulder 6 formed on the inside of the sleeve is rounded off so that when the conduit is locked in place in the adapter the wires drawn thru it will not be scraped and cut or otherwise injured that would cause a short circuit or a break in the wire.

While I have shown and described the sleeve 1 of the conduit adapter as having its threaded end inserted into the conduit or outlet box, it is, of course, understood that the sleeve may be made as illustrated in section in Figure 3 in which the threaded portion of the sleeve is located on the outside of the box and the head 3 thereof on the inside of the box.

I claim:

1. An adapter for fastening the ends of a conduit into the thin wall of a conduit box comprising a sleeve, a thread on the outside of said sleeve on one end thereof, a conical shoulder on the outside of said sleeve beginning at said thread and tapering outward to the other end thereof, the small diameter of said conical shoulder being adapted to enter the opening in the wall of the conduit box, slots in the cone end of said sleeve dividing said conical shoulder into sections that can be compressed by the opening in the wall of the box as the cone is forced into it sufficiently to clamp the conduit, a lock nut threaded in said sleeve said nut being undercut on the inner side to such an extent that it will clear the end of the cone if it is drawn through the wall of the box, the cone having such a degree of taper that the thin wall of a standard outlet box will be substantially clamped between the nut and the cone at the same time forcing the cone to clamp the conduit.

2. An adapter for fastening the cylindrical end of a conduit into the thin wall of a conduit box, comprising a sleeve adapted to extend through the wall of a conduit box and embrace and clamp the conduit therein, a thread on the outside of said sleeve on one end thereof, a compressible hollow cone on the outside of said sleeve beginning at said thread and tapering outward to the other end thereof, the small diameter of said compressible hollow cone being adapted to enter the opening in the wall of the conduit box and a lock nut threaded on the outside of said sleeve to draw said compressible hollow cone into the opening in the wall of the conduit box thereby compressing said hollow cone to grip the end of a conduit located therein, the cone having such a degree of taper that the thin wall of a standard outlet box will be substantially clamped between the nut and the cone at the same time forcing the cone to clamp the conduit.

In testimony whereof I affix my signature.

THOMAS H. LUDLOW.